United States Patent Office 3,404,147
Patented Oct. 1, 1968

3,404,147
MONOHALOALKYL AND POLYHALOALKYL
LACTAMS
Raymond L. Mayhew, Summit, and Frederick Grosser,
Midland Park, N.J., assignors to GAF Corporation, a
corporation of Delaware
No Drawing. Continuation-in-part of application Ser. No.
340,799, Jan. 28, 1964. This application Dec. 22, 1965,
Ser. No. 515,728
9 Claims. (Cl. 260—239.3)

ABSTRACT OF THE DISCLOSURE

5-, 6- and 7-membered lactams are polyhaloalkylated by heating a mixture consisting of from 5 to 20 moles of said lactams with one mole of a monohalo- or polyhalo-$\alpha$-olefin of at least 2 carbon atoms in the presence of approximately from 0.05 to 0.25 mole of an organic peroxide at a temperature of from 80° to 200° C.

This application is a continuation-in-part of our application Ser. No. 340,799, filed on Jan. 28, 1964, now abandoned.

This invention relates to a new and useful class of monohaloalkyl and polyhaloalkyl lactams and to the process of preparing the same.

To provide a new and useful class of monohaloalkylated and polyhaloalkylated 5-, 6- and 7-membered lactams and the process of preparing the same constitutes the principal object of the present invention.

Other objects and advantages will become manifest from the following description.

The foregoing objects are attained by the addition of a monohalo- or polyhalo-$\alpha$-olefin of at least 2 carbon atoms to a 5-, 6- or 7-membered lactam while employing an organic peroxide as the initiator. The addition (mono- or poly-haloalkylation) is readily accomplished by heating a mixture consisting of from 5 to 20 moles of a 5-, 6- or 7-membered lactam with one mole of a monohalo- or poly-halo-$\alpha$-olefin of at least 2 carbon atoms, in the presence of approximately from 0.05 to 0.25 mole of an organic peroxide, under pressure in a stainless steel rocker bomb at a temperature of 80°–200° C. for a period of time ranging from 5 to 24 hours. The lactam, monohalo- or poly-halo-$\alpha$-olefin, if not gaseous, and the organic peroxide, are added into the stainless steel rocker bomb. The monohalo- or polyhalo-$\alpha$-olefin, if gaseous, is injected to the bomb through its gas valve after the addition of the lactam and organic peroxide. The bomb is then sealed, heated and maintained with shaking at the said temperature and period of time. The pressure developed in the bomb may range from 50 to 1000 p.s.i.g. After cooling the contents of the bomb to room temperature, they are discharged into any suitable vacuum distillation equipment to remove the excess lactam and the residual product, monohaloalkyl- or polyhaloalkyl-lactam, recovered either as a liquid or solid of a boiling point higher than that of the starting lactam.

The 5-, 6- and 7-membered lactams that are reacted with a monohalo- or polyhalo-$\alpha$-olefin of at least 2 carbon atoms in accordance with the present invention are characterized by the following formula:

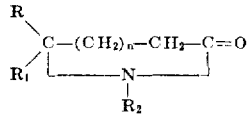

wherein R and $R_1$ represent either hydrogen, methyl or ethyl group, $R_2$ represents either hydrogen, alkyl of from 1 to 18 carbon atoms, amino alkyl of from 1 to 18 carbon atoms, hydroxy alkyl of from 2 to 18 carbon atoms and $n$ represents an integer of from 1 to 3 so as to complete a 5-, 6- or 7-membered heterocyclic ring system.

As examples of such lactams, the following are illustrative: 2-pyrrolidone, 5-methyl-2-pyrrolidone, 5,5-dimethyl-2-pyrrolidone, 5-ethyl-2-pyrrolidone, 5-methyl-5-ethyl-2-pyrrolidone, 2-piperidone, 6-methyl-2-piperidone, 6-ethyl-2-piperidone, 6,6-diethyl-2-piperidone, caprolactam, 7-methyl caprolactam, 7-ethyl caprolactam, 7,7-diethyl caprolactam.

The N-substituted lactams, wherein the substituent is characterized by $R_2$ in the foregoing formula, are readily prepared by reacting the corresponding lactones with alkyl primary amines of from 1 to 18 carbon atoms, alkyl diamines of from 2 to 18 carbon atoms and alkanol amines of from 2 to 18 carbon atoms by the well-known and established conventional procedures.

As examples of alkyl primary amines which may be reacted with the corresponding lactones to arrive at an N-alkyl substituent of from 1 to 18 carbon atoms, the following are illustrative: methyl amine, ethyl amine, n-propyl amine, n-butyl amine, n-hexyl amine, n-octyl amine, decyl amine, lauryl amine, dodecyl amine, hexadecyl amine, octadecyl amine.

As examples of alkyl diamines which may be reacted with the corresponding lactones to yield amino N-substituted amino alkyl of from 2 to 10 carbon atoms as characterized by $R_2$ in the above formula, the following are illustrative: ethylene diamine, trimethylene diamine, tetramethylene diamine, hexamethylene diamine, octamethylene diamine, decamethylene diamine, octadecamethylene diamine.

As examples of alkanol amines which are reacted with the corresponding lactones to yield N-hydroxy alkyls of from 2 to 18 carbon atoms, as characterized by $R_2$ in the foregoing formula, the following are illustrative: ethanol amine, propanol amine, butanol amine, hexanol amine, octanol amine, decanol amine, dodecanol amine, hexadecanol amine, octadecanol amine.

Any monohalo- or polyhalo-$\alpha$-olefin of at least 2 carbon atoms may be employed in the reaction of the foregoing lactams, the only restriction being that such olefin contain an ethylenic unsaturation in $\alpha$-position and that the number of carbon atoms therein be at least 2 to as many carbon atoms as are available or can be made available in such olefins by synthesis. In other words, the length of the carbon chain in such monohalo- and polyhalo-$\alpha$-olefins is immaterial since they will all react with the lactams under the foregoing reaction conditions.

As examples of monohalo- and polyhalo-$\alpha$-olefins, which react with the foregoing lactams, the following are illustrative:

dichlorovinylidene fluoride ($CCl_2=CF_2$)
chlorovinylidene fluoride ($CHCl=CF_2$)
chlorotrifluoroethylene ($CClF=CF_2$)
tetrofluoroethylene ($CF_2=CF_2$)
tetrachloroethylene ($CCl_2=CCl_2$)
vinylidene fluoride ($CH_2=CF_2$)
vinylidene chloride ($CH_2=CCl_2$)
vinylidene chlorofluoride ($CH_2=CClF$)
s-dichloroethylene ($CHCl=CHCl$)
1,2-dichloro-1,2-difluoroethylene ($CClF=CClF$)
1,2-difluoroethylene ($CHF=CHF$)
1-chloro-2-fluoroethylene ($CHF=CHCl$)
1-dichloro-2-fluoroethylene ($CHF=CCl_2$)
trichloroethylene ($CHCl=CCl_2$)
trifluoroethylene ($CF_2=CHF$)
1-dichloro-2-difluoroethylene ($CF_2=CCl_2$)
chlorotrifluoroethylene ($CF_2=CClF$)
1-chloro-2-difluoroethylene ($CF_2=CHCl$)
1-dichloro-2-difluoroethylene ($CF_2=CCl_2$)

fluorotrichloroethylene (CCl$_2$=CClF)
vinyl chloride (CH$_2$=CHCl)
vinyl fluoride (CH$_2$=CHF)
allyl chloride (CH$_2$=CH—CH$_2$Cl)
β,γ-dichloro-1-propylene (CH$_2$=CClCH$_2$Cl)
4-chloro-1-butene (CH$_2$=CH—CH$_2$—CH$_2$Cl)
3,4-dichloro-1-butene (CH$_2$=CHCHClCHCl)
3,3,4,4,4-pentafluoro-1-butene (CH$_2$=CH—CF$_2$—CF$_3$)
5-chloro-1-pentene (CH$_2$=CH—CH$_2$CH$_2$CH$_2$Cl)
3,3,4,4,5,5,5-heptafluoro-1-pentene
 (CH$_2$=CH—CF$_2$—CF$_2$—CF$_3$)
3,3,4,4,5,5,6,6,6-nonafluoro-1-hexene
 (CH$_2$=CH—CF$_2$—CF$_2$—CF$_2$—CF$_3$)

As organic peroxide catalysts (initiators) for the monohaloalkylation and polyhaloalkylation of the foregoing lactams, any one of the known tertiary-alkyl organic peroxides and hydroperoxides such as, for example, di-t-butyl peroxide, t-butyl perbenzoate, di-ti-butyl perphthalate, t-butyl-pentamethyl-ethyl peroxide, t-butyl-triphenylmethyl peroxide, di-t-amyl peroxide, bis-(triethylmethyl) peroxide, bis - (triphenylmethyl)peroxide, 2,5 - dimethylhexyl-2,5 - dihydroperoxide, 2,5 - dimethyl-2,5 - di(t-butyl peroxy)hexane, 2,5 - dimethylhexyl - 2,5 - di(peroxy benzoate), t-butyl hydroperoxide, para-methane hydroperoxide, t-butyl peroctotate and the like may be used.

The positions at which mono-haloalkylation, di-haloalkylation and tri-haloalkylation occurs in the lactam ring varies and is dependent on the nature of the lactam. For example, when the lactam is free from lower alkyl substituents in the omega position to the carbonyl and on the nitrogen atom, i.e., wherein R, R$_1$ and R$_2$ in the foregoing formula are hydrogen, and the mole ratio of such lactam to monohalo- or polyhalo-α-olefin is 5 to 20, monosubstitution by a haloalkyl takes place at the alpha and omega positions to the carbonyl in the lactam ring. In other words, a mixture of two monosubstituted isomers is obtained.

With lactams wherein R and R$_1$ in the foregoing formula are lower alkyl and R$_2$ is hydrogen, monosubstitution by a haloalkyl takes place in α-position to the carbonyl. However, with lactams wherein R or R$_1$ are lower alkyl and R$_2$ is either alkyl, aminoalkyl or hydroxyalkyl, isomeric monosubstitution by a haloalkyl takes place in α-position to the carbonyl and on the first carbon of the R$_2$ group immediately adjacent to the nitrogen atom of the lactam ring. The latter isomeric distribution can be exemplified with a haloalkylated N-substituted-5-methyl pyrrolidone by the following illustration:

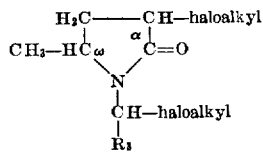

wherein R$_3$ is either hydrogen, alkyl, aminoalkyl or hydroxyalkyl of from 1 to 17 carbon atoms.

With a ratio of less than 5 moles of lactam (wherein R, R$_1$ and R$_2$ in the foregoing formula are hydrogen) per mole of monohalo- or polyhalo-α-olefin, substantial disubstitution, i.e., 2:1 adducts, takes place in the α- and omega (ω) positions of the lactam ring as well as propagation where one or more additional moles of monohalo- or polyhalo-α-olefin add to the first mole which had added to the lactam ring. This propagation is termed polyalkylation as distinguished from mono-, di- and tri-haloalkylation. In other words, the tendency towards di- and poly-substitution at the active sites of the lactam ring increases as the ratio of lactam to the monohalo- or polyhalo-α-olefin decreases below 5 moles of lactam per mole of said olefin.

The distribution of the isomeric products obtained in accordance with the present invention was shown by complete separation of the isomers by preparative vapor phase chromatography (VPC), elemental analysis, infrared (IR) and nuclear magnetic resonance (NMR) spectroscopy.

The pure isomer is readily separated from the reaction mixture by gas chromatograph separation using a preparation column. The products containing from 1 to 3 isomeric haloalkyl groups, may be, if desired, separated by fractional distillation. However, for the applications for which these haloalkylated lactams are intended, products consisting of mixed isomeric haloalkyl lactam can be used per se, and in some instances are preferred over anyone of the pure isomers.

The haloalkylated lactams prepared in accordance with the present invention are new compounds having new and useful applications as will be noted hereinafter. The new compounds are characterized by the following formulae:

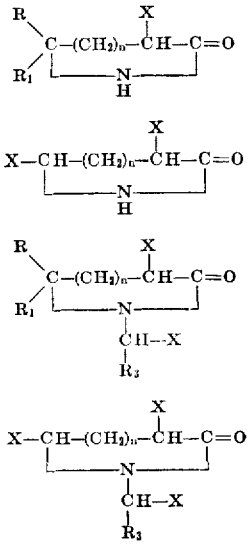

wherein R, R$_1$, R$_3$ and $n$ have the same values as above and the X's are independently selected from the group consisting of hydrogen, monohaloalkyl and polyhaloalkyl of at least 2 carbon atoms, and wherein at least one of the X's is selected from said monohaloalkyl and polyhaloalkyl groups.

Instead of employing any one of the foregoing individual monohalo- or polyhalo-α-olefins, a mixture of two or more of such olefins may be employed as the haloalkylating medium to yield mixed haloalkylated lactams.

The following examples will show how a mono-, halo- and polyhalo-α-olefin are employed to haloalkylate a lactam and characteristics of the resulting product.

EXAMPLE 1

Into a one-liter stainless steel shaker bomb, after a nitrogen purge, there were charged the following reactants:

| | Grams |
|---|---|
| 2-pyrrolidone (9.0 moles) | 765 |
| Allyl chloride (0.9 mole) | 69 |
| Di-t-butyl peroxide (0.075 mole) | 11 |

Since the allyl chloride is a liquid at room temperature, it was added directly with the other components. The bomb was then sealed, heated with shaking and maintained at 130–140° C. for 10 hours. The contents after cooling and venting the bomb were transferred into a one-liter reaction flask and the excess reactants removed in vacuum. The residue was then carefully distilled in vacuum using a 250-ml. distillation flask and a 10″ long glass helix packed column. The liquid product was collected at a range of 100°–110° C. and 0.5–1.0 mm. Hg. It weighed 17.5 grams, corresponding to a total of 12% yield based on the allyl chloride. The product thus obtained was fractionated by vapor phase chromatography (VPC) using a preparative column. The two fractions that were obtained were analyzed and their structure determined by elemental analysis, infrared (IR) and by nuclear magnetic resonance (NMR) spectroscopy as follows:

(1) 5-(3-chloropropyl)pyrrolidone.
(2) 3-(3-chloropropyl)pyrrolidone.

The isometric distribution of these two fractions was found to be in the ratio of 2:1. In other words, isomer No. 1 was twice as much as isomer No. 2.

EXAMPLE 2

Example 1 was repeated with the exception that the allyl chloride was replaced by 123 grams (0.5 mole) of 3,3,4,4,5,5,6,6,6-nonafluoro-1-hexene. The product obtained weighed 86 grams corresponding to a total of 52% yield based on the polyfluoro olefin. After fractionation of the product on a preparative VPC column, two fractions were obtained.

Elemental analysis, IR and NMR studies showed the following structures of the two fractions:

(1) 5-(6,6,6,5,5,4,4,3,3-nonafluoro - 1 - hexyl)pyrrolidone.
(2) 3-(6,6,6,5,5,4,4,3,3-nonafluoro - 1 - hexyl)pyrrolidone.

The two isomeric products are solids at room temperature. The ratio of isomer (1) to isomer (2) is 2.5:1, respectively.

EXAMPLE 3

Example 1 was again repeated with the exception that 765 grams of 2-pyrrolidone were replaced by 594 grams (6 moles) of N-methyl-2-pyrrolidone and the 69 grams of allyl chloride were replaced by 90 grams (0.6 mole) of hexafluoropropylene. The liquid product was collected at a range of 95°–110° C. and 1–6 mm. Hg. It weighed 107 grams corresponding to a 72% yield based on the hexafluoropropylene. After fractionation of the product on a preparative VPC column, three fractions were obtained.

Elemental analysis, IR and NMR studies showed the following structures of the three fractions:

(1) 5-(3,3,3,2,1,1-hexafluoropropyl) - N - methyl - 2-pyrrolidone.
(2) 3-(3,3,3,2,1,1 - hexafluoropropyl) - N - methyl-2-pyrrolidone.
(3) N - (4,4,4,3,2,2 - hexafluoro - 1-butyl)-2-pyrrolidone.

The three isomeric products are liquids at room temperature. The ratio of isomers (1), (2) and (3) are 60:25:15, respectively.

EXAMPLE 4

Into a one-liter stainless steel shaker bomb, after a nitrogen purge, was charged a solution of the following reactants:

2-piperidone=600 grams (6.0 moles),
2,5 - dimethyl-2,5-di(t-butylperoxy)hexene (95%)=15.0 grams (0.049 mole),
3,3,4,4,5,5,5-heptafluoro-1-pentene=98 grams (0.5 mole).

The bomb was then immediately sealed, heated with shaking and maintained at 140–160° C. for 16 hours. After cooling and venting, the contents of the bomb were discharged into a reaction flask. The unreacted reactants and other volatiles were stripped in atmospheric and vacuum pressures using a 10″ vigreux column. The residue obtained after stripping was transferred into a 250-ml. flask and fractionated through a 10 plate column. The product, which was collected at 150°–160° C. and 0.05–2 mm. Hg. pressure, weighed 52 grams corresponding to 35.2% yield based on the heptafluoropentene charged.

After fractionation of the product on a preparative VPC column, two fractions were obtained.

Elemental analysis, IR and NMR studies showed the following structures of the two fractions:

(1) 5 - (5,5,5,4,4,3,3 - heptofluoro-1-pentyl)-2-piperidone.
(2) 3-(5,5,5,4,4,3,3 - heptafluoro - 1 - pentyl)-2-piperidone.

The two isomeric products are solid at room temperature. The ratio of isomers (1) and (2) is 1.6:1, respectively.

EXAMPLE 5

Into a one-liter stainless steel shaker bomb, after a nitrogen purge, a solution of the following reactants was charged:

ε-caprolactam=684 grams (6.0 mole)
Di-t-butyl peroxide=12.0 grams (0.082 mole)

The bomb was immediately capped and through its gas valve and charged with 60 grams (0.6 mole) of tetrafluoroethylene and sealed. The bomb was then heated with shaking and maintained at 125–135° C. for 14 hours. After cooling, it was vented and the contents of the bomb discharged into a one-liter reaction flask and the excess reactants stripped in vacuum using a 6-inch vigreux column. The residue was transferred into a 500 ml. flask and fractionated through a 12-inch packed column. The product was collected at 145°–160° C. at 0.5–4 mm. Hg pressure. It weighed 53 grams, corresponding to 41.3% yield based on the tetrafluoroethylene used.

After fractionation of the product on a preparative VPC column, two fractions were obtained.

Elemental analysis, IR and NMR studies showed the following structures of the two fractions:

(1) 7-(1,1,2,2-tetrafluoroethyl)caprolactam.
(2) 3-(1,1,2,2-tetrafluoroethyl)caprolactam.

The two isomeric products are solids at room temperature. The ratio of isomers (1) and (2) is 1.5:1, respectively.

EXAMPLE 6

Into a one-liter stainless steel shaker bomb, after a nitrogen purge, a solution of the following reactants was charged:

N-hydroxyethyl-2-pyrrolidone=645 grams (5 moles)
Di-t-butyl peroxide=15 grams (0.1 mole)

The bomb was immediately capped through its gas valve and charged with 75 grams (0.5 mole) of hexafluoropropylene and sealed. The bomb was then heated with shaking and maintained at 125–140° C. for 12 hours. After cooling, it was vented and the contents of the bomb discharged into a one-liter reaction flask and the excess reactants flask distilled in vacuum. The residue was transferred to a 250 ml. flask and flask distilled at a low vacuum of 0.01 to 0.05 mm. Hg at 165° C.–180° C. The product weighed 19.8 grams, corresponding to 14.1 yield based on the hexafluoropropylene.

After fractionation of the product on a preparative VPC column, three fractions were obtained.

Elemental analysis, IR and NMR studies showed the following structures of the three fractions:

(1) 5-(1,1,2,3,3,3 - hexafluoropropyl)N-hydroxyethyl-2-pyrrolidone.
(2) 3-(1,1,2,3,3,3 - hexafluoropropyl)N-hydroxyethyl-2-pyrrolidone.
(3) N-(1-hydroxymethyl-2,2,3,4,4,4-hexafluorobutyl)-2-pyrrolidone.

The three isomeric products are solids at room temperature. The ratio of isomers (1), (2) and (3) is 4:3:1, respectively.

The mono-haloalkylated and poly-haloalkylated lactams, hereinafter referred to simply for sake of brevity as haloalkylated lactams, as above prepared, are excellent solvents for polystyrene, polyacrylonitrile, cellulose triacetate, shellac, etc. They are excellent paint and varnish film softeners and are especially useful in paint and varnish removal formulations. In view of their polyhalogen content, they exhibit an extremely low fire hazard. They are especially adaptable in petroleum processing; in specialty inks, and in the dyeing of polyacrylonitrile fibers with acetate dyes. They are excellent swelling agents for cellulose acetate films, fibers and as solvents in the welding of plastic films and in adhesive applications.

The polyhaloalkylated lactams are effective nematocides. They are useful as intermediates for preparation of agricultural pesticides, dyes and fire-retardant compositions. They are excellent solvents in dye baths for dyeing synthetic fibers. They are especially suitable for melt spinning of polyacrylonitrile. Solutions of polymers of acrylonitrile in the polyhaloalkylated lactams are particularly adaptable for wet or dry spinning into fibers, and for casting into films or sheets.

In the polymerization of pyrrolidone in the presence of an alkaline polymerization catalyst, the polyhaloalkylated lactams increase the rate of polymerization, the yield, as well as the quality of the resulting polymer. The polyhaloalkylated lactams are useful as selective solvents for hydrocarbons, such as, in the separation of liquid aromatic olefinic, naphthenic and paraffinic hydrocarbons from one another by solvent extraction and extractive distillation. In the thermal polymerization of caprolactam, they initiate the polymerization in the absence of any other reactants. They are excellent polymerization inhibitors of diacetylene compounds. Their addition to hectograph transfer solvents reduces flammability and improves the copy quality. They are useful as shrinking agents for the shrinking and setting of polyacrylonitrile textile filaments. They are excellent for solvent extraction, especially gas oils for removal of metal contaminants. The polyhaloalkylated lactams are more selective than phenol or furfural for metal removal in solvent extraction processes, and are readily recovered by distillation.

We claim:
1. A lactam having the following formula:

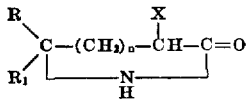

wherein R and R₁ are selected from the group consisting of hydrogen, methyl and ethyl, $n$ is an integer of from 1 to 3, and X is a polyhaloalkyl of from 3 to 6 carbon atoms wherein the polyhalo substituents in said polyhaloalkyl are at least 2 halo substituents of the group consisting of chlorine and fluorine.

2. A lactam having the following formula:

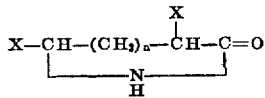

wherein the X's are independently selected from the group consisting of hydrogen and polyhaloalkyl of from 3 to 6 carbon atoms wherein the polyhalo substituents in said polyhaloalkyl are at least 2 halo substituents of the group consisting of chlorine and fluorine, and wherein at least one of the X's is the said polyhaloalkyl.

3. The process of preparing haloalkylated lactams which comprises heating in a sealed container from 5 to 20 moles of a lactam having the following formula:

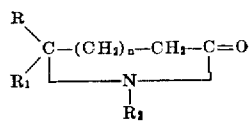

wherein R and R₁ are selected from the group consisting of hydrogen, methyl and ethyl, R₂ is selected from the group consisting of hydrogen, alkyl of from 1 to 18 carbon atoms, aminoalkyl of from 1 to 18 carbon atoms and hydroxyalkyl of from 1 to 18 carbon atoms, and $n$ is an integer of from 1 to 3, with one mole of a halogenated-α-olefin selected from the group consisting of monohalo-α-olefin and polyhalo-α-olefin of at least 2 carbon atoms at a temperature of from 80° to 200° C. in the presence of from 0.05 to 0.25 mole of an organic peroxide.

4. The process of preparing haloalkylated lactams which comprises heating in a sealed container from 5 to 20 moles of a lactam having the following formula:

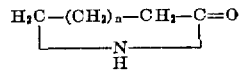

wherein $n$ is an integer of from 1 to 3 with one mole of a halogenated-α-olefin selected from the group consisting of monohalo-α-olefin and polyhalo-α-olefin of at least 2 carbon atoms at a temperature of from 80° to 200° C. in the presence of from 0.05 to 0.25 mole of an organic peroxide.

5. The process according to claim 3 wherein the lactam is 2-pyrrolidone.

6. The process according to claim 3 wherein the lactam is N-methyl-2-pyrrolidone.

7. The process according to claim 3 wherein the lactam is 2-piperidone.

8. The process according to claim 3 wherein the lactam is ε-caprolactam.

9. The process according to claim 3 wherein the lactam is N-hydroxyethyl-2-pyrrolidone.

References Cited

FOREIGN PATENTS 660,638  7/1965  Belgium.
666,638  7/1965  Belgium.

OTHER REFERENCES

Clarke et al.: J. A. C. S., vol. 71, pp. 2821–5 (1949).
Bohme et al.: I, "Arch Pharm.," vol. 294, pp. 307–11 (1961).
Bohme et al.: II, "Arch Pharm.," vol. 294, pp. 344–8 (1961).
Cummings et al.: J. Chem. Soc., pp. 4591–5, 4597–8 (1964).

HENRY R. JILES, *Primary Examiner.*

ROBERT T. BOND, *Assistant Examiner.*